United States Patent [19]

Turner

[11] Patent Number: 5,085,365
[45] Date of Patent: Feb. 4, 1992

[54] WATER-SOLUBLE SOLDERING FLUX

[75] Inventor: Raymond L. Turner, La Habra, Calif.

[73] Assignee: Hughes Aircraft Company, Los Angeles, Calif.

[21] Appl. No.: 523,765

[22] Filed: May 15, 1990

[51] Int. Cl.$^5$ ............................................... B23K 1/20
[52] U.S. Cl. ..................................... 228/223; 228/207
[58] Field of Search ................ 228/223, 207; 148/23, 148/25

[56] References Cited

U.S. PATENT DOCUMENTS

| 1,402,644 | 1/1922 | Passalacqua | 148/25 |
| 3,020,635 | 2/1962 | Redgrift | 228/223 |
| 3,091,029 | 5/1963 | Davis | 228/224 |
| 3,305,406 | 2/1967 | Chmelick et al. | 148/23 |
| 3,925,112 | 12/1975 | Petersen, Sr. et al. | 148/25 |
| 4,290,824 | 9/1981 | Cole | 148/23 |
| 4,342,606 | 8/1982 | Notton | 148/23 |
| 4,342,607 | 8/1982 | Zado | 148/23 |
| 4,460,427 | 7/1984 | Haney et al. | 427/98 |
| 4,478,650 | 10/1984 | Zado | 148/23 |
| 4,568,395 | 2/1986 | Nabhani | 148/23 |
| 4,738,732 | 4/1988 | Anderson et al. | 148/23 |
| 4,809,901 | 3/1989 | Gen et al. | 148/23 |
| 4,872,928 | 10/1989 | Jacobs | 148/24 |

FOREIGN PATENT DOCUMENTS

| 104106 | 3/1922 | France . |
| 460965 | 4/1975 | U.S.S.R. . |

OTHER PUBLICATIONS

Weast *CRC Handbook of Chemistry and Physics;* CRC Press; Boca Raton, Fl.; 1984; pp. D-222, D-229.
Anderson, et al., filed Apr. 11, 1989, "Method and Composition for Protecting and Enhancing the Solderability of Metallic Surfaces".

*Primary Examiner*—Kenneth J. Ramsey
*Attorney, Agent, or Firm*—William C. Daubenspeck; Wanda K. Denson-Low

[57] ABSTRACT

A non-toxic, non-corrosive liquid soldering flux is provided, comprising an organic acid, such as citric acid, and a non-toxic carrier, such as water. This unique flux produces solder joints of high mettalic luster and excellent quality. Disposal presents no health hazards, and clean-up of flux residues is accomplished using only water.

14 Claims, No Drawings

WATER-SOLUBLE SOLDERING FLUX

TECHNICAL FIELD

The present invention relates to a novel soldering flux used in liquid wave soldering.

BACKGROUND ART

Most fluxes and defluxing chemicals used by industry to manufacture electronic circuits, such as military hardware, are either contributing to ozone depletion of the atmosphere or are considered by local environmental agencies, such as the Air Quality Management District in the Los Angeles basin, as environmental pollutants or health hazards. For example, it has been reported that if CFCs (chlorofluorohydrocarbons), which are used in vapor degreasing to clean soldered parts where a rosin flux is employed, are released to the atmosphere, they will remain there as an ozone depletant for nearly 100 years. Other chemicals such as rosin fluxes, alcohols, and the like pose health risks and disposal problems for industry.

Water-soluble fluxes could be the simple solution for this major problem. However, most water-soluble fluxes are formulated with harsh activators, such as hydrochloric acid and complex glycols, which create major cleaning and residue problems for the printed circuit board and the electrical circuitry thereon and which tend to severely corrode the metal being soldered or contaminate the dielectric, causing a tendency for electromigration. Other water-soluble fluxes are formulated with iso-propanol and/or plasticizers, which create disposal and health problems.

What is desired is a simple, non-toxic, non-corrosive liquid soldering flux that produces solder joints of high metallic luster and excellent quality, regardless of the method of soldering (hand, wave, drag, etc.).

DISCLOSURE OF INVENTION

In accordance with the invention, a soldering flux is provided, comprising a water-soluble organic acid having at least two carboxylic acid groups and a carrier comprising at least one member selected from the group consisting of water, alcohols, glycols, and terpenes.

The flux of the invention eliminates harmful environmental emissions normally associated with rosin-based fluxes, flux thinner (such as iso-propanol), and associated defluxing solvents (such as CFCs). The flux of the invention is environmentally safe, non-toxic, and easy to use. Soldering time is cut in half, and defluxing (cleaning) time is reduced from ten to fifteen minutes (required for rosin-based fluxes) to about three minutes. Soldered assemblies can be cleaned in deionized water, thus eliminating the high capital costs associated with vapor degreasing equipment and associated solvent. The resulting soldered joint exhibits high metallic luster and excellent electrical quality.

BEST MODES FOR CARRYING OUT THE INVENTION

The flux of the invention comprises (a) a water-soluble organic acid having at least two carboxylic acid groups and (b) water. Examples of suitable organic acids include citric acid, malic acid, tartaric acid, glutamic acid, phthalic acid, and the like.

However, the best results have been obtained with citric acid, and while the class of organic acids indicated above is useful, the remainder of the description which follows is directed to the use of an aqueous solution of citric acid as a solder flux in liquid wave soldering.

Without subscribing to any particular theory, it appears that the citric acid chelates the oxide, but not the basis metal. As a result, there is little or no corrosion of the basis metal by the flux of the invention. Thus, to the extent that members of the above class of organic acids behaves similarly to citric acid, then such members are also included within the ambit of the invention.

The concentration range of citric acid in water may range from about 0.5 to 99.5 percent (by weight). A concentration of at least about 5 wt % provides noticeably improved soldering results, while concentrations above about 40 wt % provide no additional improvement, and accordingly, this range is preferred. A concentration of at least about 20 wt % ensures consistently improved soldering results, even for less-than-ideal soldering surfaces, and accordingly, the range of about 20 to 40 wt % is most preferred.

The quality of water used and the grade of citric acid employed are not material in the practice of the invention, although for extremely sensitive electrical circuits, it may be desirable to employ distilled or deionized water and a fairly high grade of citric acid. The source of the citric acid is also immaterial, and may comprise, for example, commercially-produced powder or even fruit juice or fruit juice concentrate, such as juice from oranges, lemons, limes, grapefruits, pineapples, tomatoes, and the like. Finally, the flux may contain other components, such as impurities, whether accidental or deliberate, so long as such additives have no adverse effect on the soldering results.

While water is the preferred carrier, it may be desirable to replace some or all of the water carrier with other water-soluble carriers, such as an alcohol, a glycol, and/or a terpene. Examples of suitable alcohols include ethanol, n-propanol, iso-propanol, and any of the butanols. Examples of glycols include ethylene glycol, propylene glycol, diethylene glycol, dipropylene glycol, triethylene glycol, and any of the polyethylene and polypropylene glycols. An example of a non-toxic terpene is L-limonene.

Thickening agents may be added to the flux in order to include the flux inside cored solder. Examples of suitable thickening agents include corn starch, tinning oil, gelatin, emulsifiers, and polyvinyl. Such thickening agents are added to provide a flux having the requisite viscosity, as is well-known in the art.

The flux is most advantageously employed in the soldering of electrical connections of electronic components to printed circuit boards. Such printed circuit boards typically comprise copper-plated lines surrounding via openings, which are copper-plated followed by a tin-lead coating over the copper, in the PCB through which the leads of the components extend. The solder employed during component soldering is typically a tin-lead solder, and the flux of the invention has been successfully used with 60-40, 63-37, and 96-4 tin-lead solders. In most applications, 63-37 tin-lead solder is employed.

The flux of the invention provides the following advantages:

1. It eliminates harmful environmental emissions normally associated with rosin-based fluxes, flux thinner (such as iso-propyl alcohol), and associated defluxing agents (such as 1,1,1-trichloroethane). Indeed, cleaning of the flux is simply done in warm or hot water. Thus, the new flux is environmentally safe.

2. It provides soldering personnel with a nontoxic, extremely safe, and highly effective flux to use.

3. Its use cuts the actual soldering time by approximately 50%. This enables automated soldering, using liquid wave soldering, to proceed at a rate twice as fast as with rosin-based solders, thereby subjecting electronic components to the heat of the solder for a far shorter period of time.

4. Defluxing (cleaning) time is cut from ten to fifteen minutes per unit (in CFC degreaser) to about one minute (in heated water).

5. Wave soldered assemblies can be cleaned in deionized water, thus eliminating the high capital cost of vapor degreasing equipment. The recurring costs of solvents and the costs associated with redistillation are also eliminated.

6. Use of the flux of the invention eliminates the need for costly control of solvent usage and equipment permits required by local environmental agencies (such as AQMD in the Los Angeles basin).

7. Use of the flux significantly reduces waste disposal and waste management costs; the flux is biodegradable and water soluble.

8. Use of the flux of the invention provides solder joints that evidence high metallic luster and excellent electrical quality.

INDUSTRIAL APPLICABILITY

The solder flux of the invention is expected to find use in commercial liquid manual and automatic soldering operations, particularly in soldering electrical components in circuit boards.

EXAMPLES

Example 1. Flux Activation Test

A flux activation test, comparing prior art fluxes (RMA, Alpha 857, Kester 2224) to the flux of the invention (citric acid solution), was performed by applying various fluxes to copper panels (2 inch x 2 inch), then drying the flux at 230° F. for 1 hour. The fluxed specimens were then cleaned and evaluated. Table I lists the composition of the flux and its appearance. RMA refers to Kester 185 rosin mildly active; Alpha 857 and Kester 2224 are water-soluble fluxes. The concentration of citric acid used was 900 g of citric acid powder per liter of water. The flux of the invention is a clear liquid.

TABLE I

| Flux Composition | Appearance |
| --- | --- |
| RMA, Kester 185 | no chemical reaction to copper |
| Alpha 857 | severe chemical reaction to copper (multi-colored etch) |
| Kester 2224 | severe chemical reaction to copper (multi-colored etch) |
| Citric Acid | no chemical reaction to copper |

The flux of the invention was on a comparable level with RMA, whereas the two commercial brands of water-soluble fluxes appeared as aggressors to copper. It was clear from the test that the flux of the invention is a unique flux and should not be placed in the category of commercial water-soluble fluxes.

Without subscribing to any particular theory, it appears that the flux of the invention acts as a chelating agent, attacking oxides without attacking the basis metal.

Example 2. Solder Spread Test

A comparison spread test was conducted to determine if the solder spread using the flux of the invention was comparable to that of rosin "RMA" flux. Solder wire (0.062 inch diameter) was formed into solder rings of ⅜ inch diameter and placed in the center of copper panels measuring 2 inch×2 inch. Three drops of flux were placed in the center of each ring. All panels were then vapor phase reflowed at the same time. The area of solder spread using the flux of the invention was repeatedly found to be over twice that of the RMA flux. Moreover, the flux of the invention evidenced a higher luster and better wetting of the substrate, compared to the RMA flux.

From the foregoing, it is clear that the flux of the invention is far superior to the RMA flux. It should also be noted that the basis metal of the copper was not attacked by the RMA flux or by the flux of the invention.

Thus, there has been disclosed a non-toxic, noncorrosive liquid soldering flux, suitable for use in soldering electrical components. It will be clear to those skilled in the art that various changes and modifications of an obvious nature may be made, and all such changes and modifications are considered to fall within the scope of the invention, as defined by the appended claims.

What is claimed is:

1. A method for soldering a metal comprising applying to a surface a soldering flux, heating said metal to a desired soldering temperature, and applying solder to said surface, characterized in that said soldering flux consists essentially of (a) a water-soluble organic acid having at least two carboxylic acid groups and (b) at least one non-toxic carrier selected from the group consisting of water, alcohols, terpenes and mixtures thereof.

2. The method of claim 1 wherein said organic acid is selected from the group consisting of citric acid, malic acid, tartaric acid, glutamic acid, and phthalic acid.

3. The method of claim 2 wherein said organic acid consists essentially of citric acid.

4. The method of claim 1 wherein said alcohols are selected from the group consisting of ethanol, n-propanol, iso-propanol, n-butanol, iso-butanol, and tert-butanol.

5. The method of claim 1 wherein said glycols are selected from the group consisting of ethylene glycol, propylene glycol, diethylene glycol, dipropylene glycol, triethylene glycol, any of the polyethylene glycols, and any of the polypropylene glycols.

6. The method of claim 1 wherein said terpene consists essentially of L-limonene.

7. The method of claim 1 wherein said surface is copper or tinned copper and said solder is a tin-lead solder.

8. A method for soldering a metal comprising applying to a surface a soldering flux, heating said metal to a desired soldering temperature, and applying solder to said surface, characterized in that said soldering flux consists essentially of about 0.5 to 99.5 wt % of citric acid in water.

9. The method of claim 8 wherein the concentration of citric acid is at least about 5 wt %.

10. The method of claim 9 wherein said concentration ranges from about 20 to 40 wt %.

11. The method of claim 8 wherein said surface is copper or tinned copper and said solder is a tin-lead solder.

12. A method for soldering a metal comprising applying to a surface a soldering flux, heating said metal to a desired soldering temperature, and applying solder to said surface, characterized in that said soldering flux consists essentially of about 5 to 40 wt % of citric acid in water.

13. The method of claim 12 wherein the concentration of citric acid ranges from about 20 to 40 wt %.

14. The method of claim 12 wherein said surface is copper or tinned copper and said solder is a tin-lead solder.

* * * * *

REEXAMINATION CERTIFICATE (2646th)

United States Patent [19]

Turner

[11] B1 5,085,365

[45] Certificate Issued Aug. 8, 1995

[54] WATER SOLUBLE SOLDERING FLUX

[75] Inventor: Raymond L. Turner, La Habra, Calif.

[73] Assignee: Hughes Aircraft Company, Los Angeles, Calif.

Reexamination Request:
No. 90/002,963, Feb. 3, 1993

Reexamination Certificate for:
| | |
|---|---|
| Patent No.: | 5,085,365 |
| Issued: | Feb. 4, 1992 |
| Appl. No.: | 523,765 |
| Filed: | May 15, 1990 |

[51] Int. Cl.$^6$ .................. B23K 1/20; H05K 3/34
[52] U.S. Cl. .................... 228/223; 228/207
[58] Field of Search .............. 148/23, 25; 228/207, 228/223

[56] References Cited

U.S. PATENT DOCUMENTS

| | | | |
|---|---|---|---|
| 1,402,644 | 1/1922 | Passalacqua | 148/25 |
| 1,535,492 | 4/1925 | Passalacqua | 148/25 |
| 1,805,458 | 5/1931 | Rogers | 106/244 |
| 2,155,307 | 4/1939 | Hagemann | 148/25 |
| 2,470,957 | 5/1949 | Strader | 148/25 |
| 3,020,635 | 2/1962 | Redgrift | 228/223 |
| 3,091,029 | 5/1963 | Davis et al. | 228/224 |
| 3,135,630 | 6/1964 | Bielinski et al | 118/410 |
| 3,162,547 | 12/1964 | Kendall | 134/3 |
| 3,220,892 | 11/1965 | Durham, Jr. | 148/23 |
| 3,305,406 | 2/1967 | Chmelik et al. | 148/23 |
| 3,459,606 | 8/1969 | Becker | 148/25 |
| 3,684,533 | 8/1972 | Conwicke | 106/1 |
| 3,723,191 | 3/1973 | Bos et al. | 148/23 |
| 3,734,791 | 5/1973 | Poliak | 148/25 |
| 3,895,973 | 7/1975 | Stayner | 148/25 |
| 3,925,112 | 12/1975 | Peterson, Sr. et al. | 148/25 |
| 3,966,632 | 6/1976 | Colliopoulos et al. | 252/309 |
| 4,073,412 | 2/1978 | Doumani | 222/192 |
| 4,113,525 | 9/1978 | Stayner et al. | 148/23 |
| 4,183,767 | 1/1980 | Kessler | 106/236 |
| 4,191,577 | 3/1980 | Buescher et al. | 106/1.12 |
| 4,290,824 | 9/1981 | Cole | 148/23 |
| 4,342,606 | 8/1982 | Notton | 148/23 |
| 4,342,607 | 8/1982 | Zado | 148/23 |
| 4,460,427 | 7/1984 | Haney et al. | 427/98 |
| 4,478,650 | 10/1984 | Zado | 148/23 |
| 4,568,395 | 2/1986 | Nabhani | 148/23 |
| 4,708,281 | 11/1987 | Nelson et al. | 228/180.1 |
| 4,708,751 | 11/1987 | Froebel et al. | 148/23 |
| 4,738,732 | 4/1988 | Anderson et al. | 148/23 |
| 4,759,490 | 4/1988 | Ochiai | 228/124 |
| 4,762,573 | 8/1988 | Biverstedt | 148/23 |
| 4,809,901 | 3/1989 | Gen et al. | 148/23 |
| 4,821,948 | 4/1989 | Fisher et al. | 228/223 |
| 4,872,928 | 10/1989 | Jacobs | 148/24 |
| 4,895,606 | 1/1990 | Jafri | 148/25 |
| 4,963,401 | 10/1990 | Kaspaul | 427/388.1 |
| 4,988,395 | 1/1991 | Taguchi et al. | 148/24 |
| 5,009,724 | 4/1991 | Dodd et al. | 148/23 |
| 5,069,730 | 12/1991 | Dodd et al. | 148/23 |

FOREIGN PATENT DOCUMENTS

| | | |
|---|---|---|
| WO8703783 | 7/1987 | Australia . |
| 0090960 | 10/1983 | European Pat. Off. . |
| 104106 | 3/1922 | France . |
| 2052713 | 3/1972 | Germany . |
| 62-6796 | 1/1987 | Japan . |
| 2080341 | 2/1982 | United Kingdom . |
| 460965 | 4/1975 | U.S.S.R. . |
| 1303341 | 4/1987 | U.S.S.R. . |

OTHER PUBLICATIONS

*Metals Handbook*, vol. 6; 9th Edition, pp. 1081–1085.

European Application, EP 91 10 7719, and search report.

Patent Abstracts of Japan, vol. 11, No. 175 (M-596) [2622], 5 Jun. 1987.

"Soviet Inventions Illustrated", week 8747, 2 Dec. 1987, Abstract No. 333423, Derwent Publications Ltd, London GB.

Patent application for "Water-Soluble Soldering Flux," by Ray L. Turner (Hughes PD-89640A), Ser. No. 07/607,200 (filed Oct. 21, 1990; abandoned Oct. 31, 1991); continuation-in-part of Ser. No. 07/523,765 (now U.S. Pat. No. 5,085,365).

Patent application for "Water-Soluble Soldering Flux," by Ray L. Turner (Hughes PD 89640C), Ser. No. 07/829,120 (filed Jan. 31, 1992); continuation-in-part of Ser. No. 07/705,858.

Patent application for "Water-Soluble Flux for Cored Solder," by Turner et al (Hughes PD-90466), Ser. No. 07/607,199, filed Oct. 31, 1990; continuation-in-part of Ser. No. 07/523,756 (now U.S. Pat. No. 5,085,365).

Patent application for "Water-Soluble Flux for Cored Solder," by Ray L. Turner (Hughes PD-91256), Ser. No. 07/708,961 filed May 31, 1991; continuation-in-part of Ser. No. 07/607,200.

Patent application for "Water-Soluble Soldering Paste," by Turner et al (Hughes PD-90465), Ser. No. 07/608,041 (filed Oct. 31, 1990); continuation-in-part of Ser. No. 07/523,765 (now U.S. Pat. No. 5,085,365).

Patent application for "Fluxing Apparatus and Method," by Turner et al (Hughes PD-90458), Ser. No. 07/608,042 (filed Oct. 31, 1990).

Patent application for "Foaming Flux for Automatic Soldering Process," by Turner et al (Hughes PD-91407), Ser. No. 07/780,169 (filed Oct. 21, 1991); continuation-in-part of Ser. No. 07/705,858.

Patent application for "Foaming Flux for Automatic Soldering Process," by Ray L. Turner (Hughes PD-91567), Ser. No. 07/780,170 (filed Oct. 21, 1991); continuation-in-part of Ser. No. 07/705,858.

Patent application for "Water-Soluble Soldering Flux," by Ray L. Turner (Hughes PD-89640B), Ser. No. 07/705,858 (filed May 28, 1991); divisional of Ser. No. 07/607,200.

Weast *CRC Handbook of Chemistry and Physics,* CRC Press, Boca Raton, Fla., 1984, pp. D-222, D-229.

Patent application for "Method and Composition for Protecting and Enhancing the Solderability of Metallic Surfaces," by Anderson et al, Ser. No. 07/336,178, (filed Apr. 11, 1989).

*Primary Examiner*—Kenneth J. Ramsey

[57] ABSTRACT

A non-toxic, non-corrosive liquid soldering flux is provided, comprising an organic acid, such as citric acid, and a non-toxic carrier, such as water. This unique flux produces solder joints of high metallic luster and excellent quality. Disposal presents no health hazards, and clean-up of flux residues is accomplished using only water.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claims 2 and 3 are cancelled.

Claims 1, 5, 8–10, 12 and 13, are determined to be patentable as amended.

Claims 4, 6–7, 11 and 14, dependent on an amended claim, are determined to be patentable.

New claims 15–23 are added and determined to be patentable.

1. A method for soldering *together* a metal *surface of a circuit board substrate and a metal surface of an electrical component in the circuit board*, comprising applying to [a surface] *one of the surfaces* a soldering flux, heating *one of* said metal *surfaces* to a desired soldering temperature, [and] applying solder to *one of* said [surface,] *metal surfaces, and joining the second metal surface to be soldered to the first*; characterized in that said soldering flux consists essentially of (a) [a water-soluble organic acid having at least two carboxylic acid groups] *citric acid* and (b) at least one non-toxic carrier selected from the group consisting of water, alcohols, terpenes and mixtures thereof; *while being substantially free of other carboxylic acids.*

5. The method of claim 1 wherein said [glycols are] *non-toxic carrier is a glycol* selected from the group consisting of ethylene glycol, propylene glycol, diethylene glycol, dipropylene glycol, triethylene glycol, any of the polyethylene glycols, and any of the polypropylene glycols.

8. A method for soldering *together* a metal *surface of a circuit board substrate and a metal surface of an electrical component in the circuit board,* comprising applying to [a surface] *one of the surfaces* a soldering flux, heating *one of* said metal *surfaces* to a desired soldering temperature, [and] applying solder to *one of* said [surface,] *metal surfaces, and joining the second metal surface to be soldered to the first*; characterized in that said soldering flux consists essentially of about 0.5 to about 99.5 [wt %] *weight percent* of citric acid in water.

9. The method of claim 8 wherein the concentration of citric acid is at least about 5 [wt %] *weight percent.*

10. The method of claim 9 wherein said concentration ranges from about 20 to 40 [wt %] *weight percent.*

12. A method for soldering *together* a metal *surface of a circuit board substrate and a metal surface of an electrical component in the circuit board,* comprising applying to [a surface] *one of the surfaces* a soldering flux, heating *one of* said metal *surfaces* to a desired soldering temperature, [and] applying solder to *one of* said [surface,] *metal surfaces, and joining the second metal surface to be soldered to the first*; characterized in that said soldering flux consists essentially of about 5 to 40 [wt %] *weight percent* of citric acid in water *and mixtures thereof; while being substantially free of other carboxylic acids.*

13. The method of claim 12 wherein the concentration of citric acid ranges from about 20 to 40 [wt %] *weight percent.*

*15. A method for soldering together a metal surface of a circuit board substrate and a metal surface of an electrical component in the circuit board, comprising applying to one of the surfaces a soldering flux, heating one of said metal surfaces to a desired soldering temperature, applying solder to one of said metal surfaces, defluxing said surface in water, and joining the second metal surface to be soldered to the first; characterized in that said soldering flux consists essentially of (a) citric acid and (b) at least one non-toxic carrier selected from the group consisting of water, alcohols, a terpene which consists essentially of L-limonene, and mixtures thereof; while being substantially free of other carboxylic acids.*

*16. A method for soldering a together a metal surface of a circuit board substrate and a metal surface of an electrical component in the circuit board, comprising applying to one of the surfaces a soldering flux, heating one of said metal surfaces to a desired soldering temperature, applying solder to one of said metal surfaces, defluxing said surface in heated water, and joining the second metal surface to be soldered to the first; characterized in that said soldering flux consists of about 20 to 40 weight percent of citric acid in at least one non-toxic carrier selected from the group consisting of water, alcohols, a terpene which consists essentially of L-limonene, and mixtures thereof.*

*17. A method for soldering two metal surfaces together, comprising applying to one of the surfaces a soldering flux, heating one of said metal surfaces to a desired soldering temperature, applying solder to one of said metal surfaces, and joining the second metal surface to be soldered to the first; characterized in that said soldering flux consists essentially of (a) citric acid and (b) at least one non-toxic carrier selected from the group consisting of water, alcohols, a terpene and mixtures thereof, wherein said terpene consists essentially of L-limonene; while being substantially free of other carboxylic acids.*

*18. A method for soldering two metal surfaces together, comprising applying to one of the surfaces a soldering flux, heating one of said metal surfaces to a desired soldering temperature, applying solder to one of said metal surfaces, and joining the second metal surface to be soldered to the first; characterized in that said soldering flux consists essentially of (a) citric acid and (b) at least one non-toxic carrier selected from the group consisting of a terpene, mixtures of a terpene with water, mixtures of a terpene with alcohol, and mixtures of a terpene with water and alcohol, wherein said terpene consists essentially of L-limonene; while being substantially free of other carboxylic acids.*

*19. A method for soldering two metal surfaces together, comprising applying to one of the surfaces a soldering flux, heating one of said metal surfaces to a desired soldering temperature, applying solder to one of said metal surfaces, and joining the second metal surface to be soldered to the first; characterized in that said soldering flux consists essentially of (a) citric acid and (b) L-limonene; while being substantially free of other carboxylic acids.*

*20. The method of one of claims 15, 16, 17, 18 or 19, wherein said surface is copper or tinned copper and said solder is a tin-lead solder.*

21. The method of one of claims 1, 15, 17, 18 or 19, wherein the concentration of citric acid is at least about 5 weight percent.

22. The method of one of claims 1, 15, 17, 18 or 19, wherein said concentration ranges from about 20 to 40 weight percent.

23. The method of one of claims 17, 18 or 19, wherein the two metal surfaces are a metal surface of a circuit board substrate and a metal surface of an electrical component in the circuit board.

* * * * *